No. 700,055. Patented May 13, 1902.
B. G. KRAPF.
MACHINE FOR SEPARATING AND CLEANING CORN CELLULOSE.
(Application filed Jan. 11, 1901.)
(No Model.) 3 Sheets—Sheet 1.
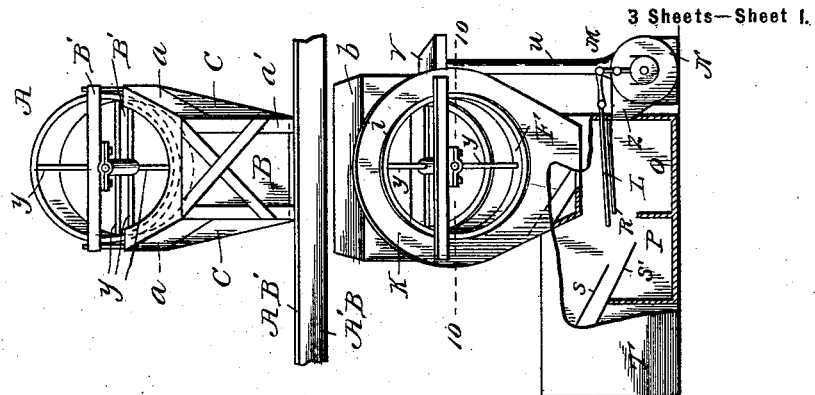
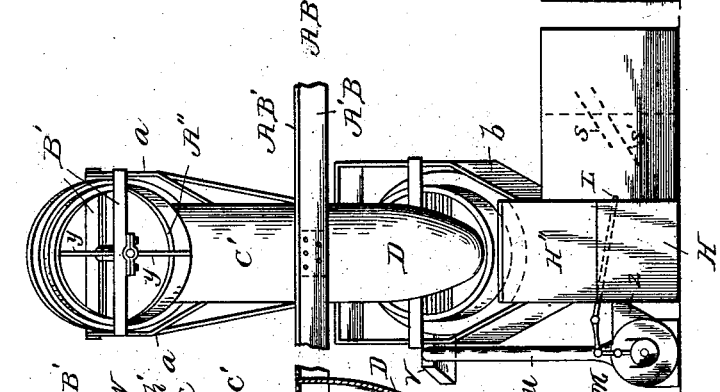
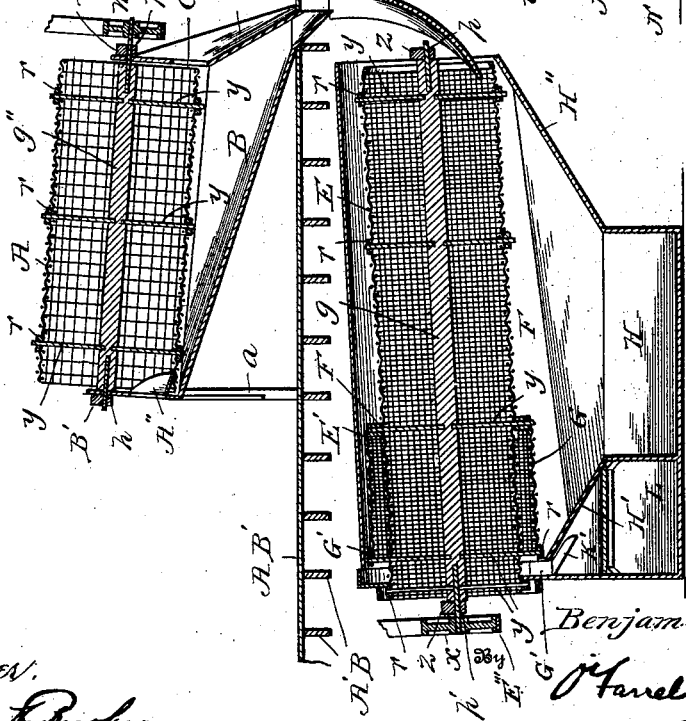
Witnesses
Inventor
Benjamin G. Krapf.
Attorneys No. 700,055. Patented May 13, 1902.
B. G. KRAPF.
MACHINE FOR SEPARATING AND CLEANING CORN CELLULOSE.
(Application filed Jan. 11, 1901.)
(No Model.) 3 Sheets—Sheet 2.
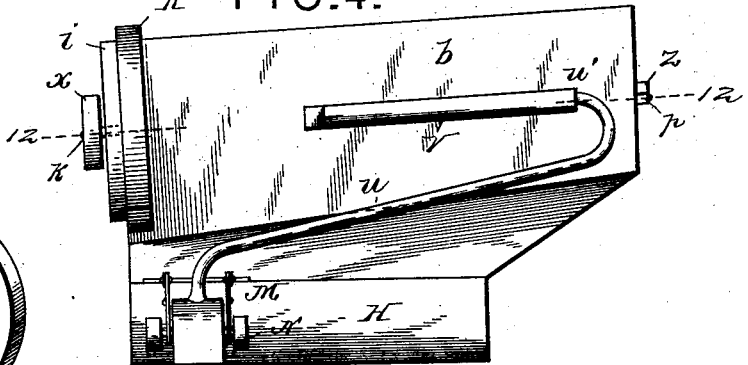
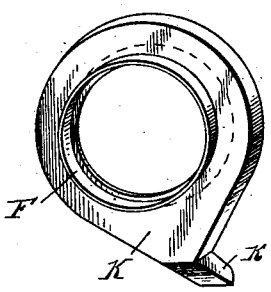
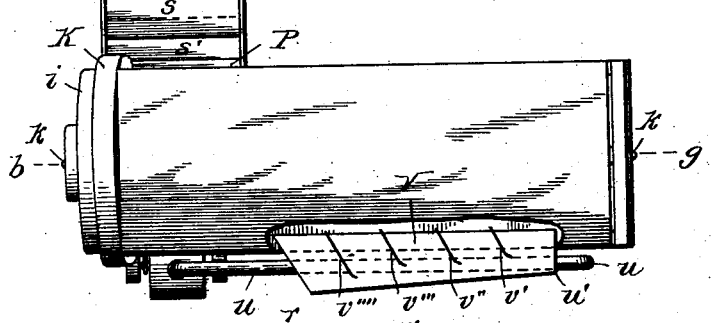
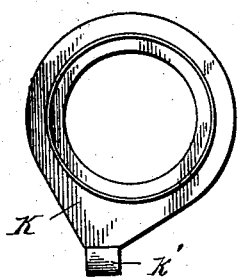
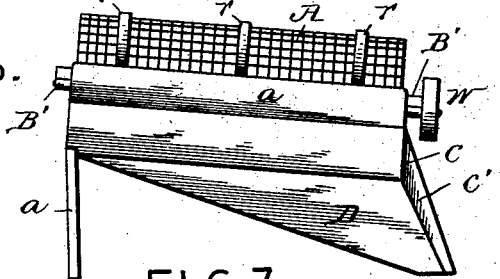
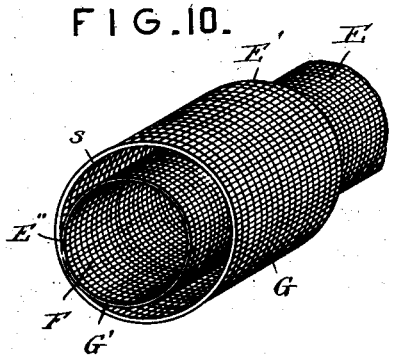
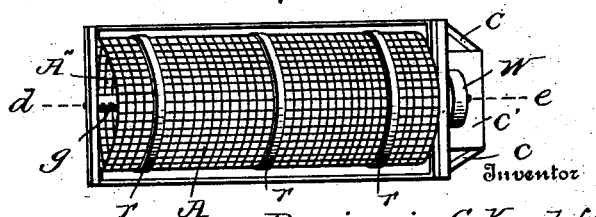
Witnesses
Inventor
Benjamin G. Krapf.
By Farrell & Lawson
Attorneys No. 700,055. Patented May 13, 1902.
B. G. KRAPF.
MACHINE FOR SEPARATING AND CLEANING CORN CELLULOSE.
(Application filed Jan. 11, 1901.)
(No Model.) 3 Sheets—Sheet 3.
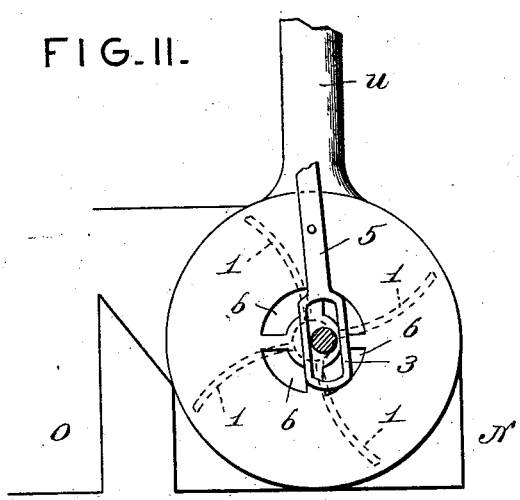
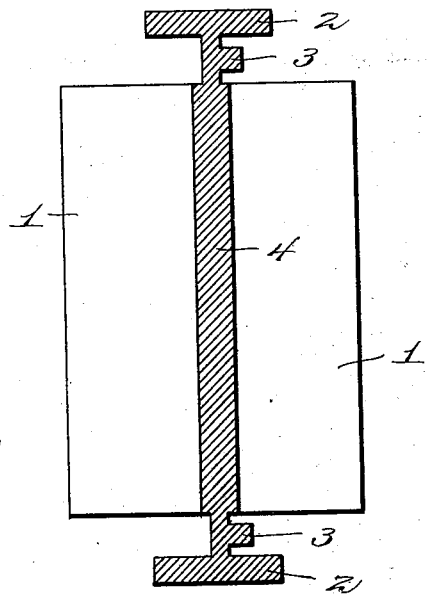
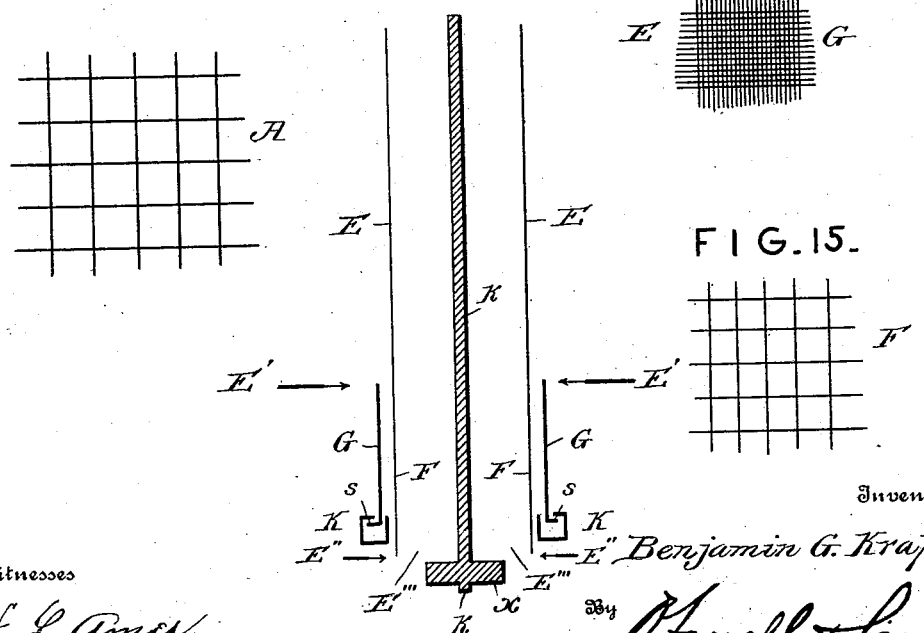
Witnesses Inventor
Benjamin G. Krapf.
By Farrell & Lawson
Attorneys

UNITED STATES PATENT OFFICE.

BENJAMIN G. KRAPF, OF TOPEKA, KANSAS.

MACHINE FOR SEPARATING AND CLEANING CORN CELLULOSE.

SPECIFICATION forming part of Letters Patent No. 700,055, dated May 13, 1902.

Application filed January 11, 1901. Serial No. 42,910. (No model.)

*To all whom it may concern:*

Be it known that I, BENJAMIN G. KRAPF, a citizen of the United States, residing at Topeka, in the county of Shawnee and State of Kansas, have invented new and useful Improvements in Machines for Separating and Cleaning Corn Cellulose, of which the following is a specification.

The crude product whence the cellulose hereinafter referred to is obtained is the debris left from shelling corn. This debris consists of several distinct parts—first, a small portion of the husk, due to the fact of the corn being imperfectly husked; second, a portion of the dry silk that adheres to the corn, sometimes threading its way between the rows thereof; third, the dust and small pieces of the corn that become detached from the kernel, and, fourth, the cellulose proper, in which the kernels are germinated. The action of the sheller upon the cob in the shelling of the corn cleans in a more or less perfect manner these substances from the cob. Heretofore they may have been thrown away as valueless. My machine utilizes them.

The object of my invention is to produce a machine which shall be competent to separate and clean this corncob cellulose, giving a product entirely clear from any foreign matter, producing what I denominate "corn feathers," a product that I claim to be equal, if not superior, in every respect for the use of pillows and beds to the ordinary fowl feathers of commerce. The factors of equality, if not of superiority, consist in the cellulose being a non-absorbent of moisture and of retaining its springy and silky condition under all ordinary circumstances.

In the drawings illustrative of my invention hereto annexed, Figure 1 is a vertical center sectional view taken through the line $d\,g$, Fig. 5, and line $d\,e$, Fig. 7. Fig. 2 is an end view of Fig. 1, taken as a whole looking to the left; and Fig. 3 is the opposite end view of same looking to the right. Fig. 4 is a side view of the lower screening-machine inclosed in the boxing $b$, and Fig. 5 a top view of same with a portion broken away to show the device for distributing air from the blower to the screen. Fig. 6 is a side view of the primary screening device with its boxing $a$, and Fig. 7 a top view of same. Fig. 8 is a detail of the conveyer-box. Fig. 9 is a rear view of same. Fig. 10 is a detail of the double screen shown in Fig. 1, showing the manner in which the larger screen G surrounds the smaller screen F. Fig. 11 is a detail of the blower N, being a side view thereof with the pulley removed in order to exhibit the openings into the blower-box and the eccentric by which the shaker-screen L is operated. Fig. 12 is a longitudinal center section of the shaft, pulleys, and eccentric, also showing two of the fans of the blower N. Figs. 13, 14, and 15 show the relative sizes of the meshes in the various cylindrical screens. Fig. 16 is a longitudinal section taken through the line 10 11, Fig. 3, and line 12 13, Fig. 4, showing the relative positions of the shaft, pulley, screens E and F and G, and conveyer-box K, particularly showing the manner in which the lower flanged end of the screen G is rotatably inclosed in the said conveyer-box.

In operating my machine the crude product is conveyed by any suitable means into the end of the primary cylinder-screen A at the point A', an inner projecting lip A'' being placed, as shown, projecting into but not touching the said screen A, its object being to convey the crude product far enough into the screen A to prevent any large particles of dirt or other matter from being thrown back again out of said screen A. The screen A is located on the floor A B (consisting of the joists A' B and floor-boards A B') above the secondary screen E in order that the product operated upon may be carried along from screen A to the screen E through the various chutes by gravity. This screen A is coarse-meshed, being in actual practice about three meshes to the inch, as shown in Fig. 13, and rotates in suitable bearings $h\,h'$ and may be driven by any suitable means, as by a pulley and belt W. This screen is set on a sharp incline, and in the rotation thereof only that portion of the product containing corn feathers passes through its meshes. The coarser material is ejected out of the lower end C and down the chute C' onto the floor or into a bin. This product is utilized for filling cheap mattresses and as a material to be used in packing. The portion passing through the screen falls onto the inclined chute B, where it slides down into the reversing concave guide D, being guided thereby into the upper end of the lower or finishing cylinder-screen E. The screen E, revolving in suitable bearings $p\ p'$, may also be driven by a belt, it being desirable, however, that its revolutions be in harmony with the revolutions of the screen A.

The upper end of the screen E is of a fine mesh, being twenty-two meshes to the inch approximately, as shown in Fig. 14, allowing only the dust and small particles of debris to pass through its meshes. On one side of the fine-meshed portion of this screen (see Figs. 4 and 5) is an air-conduit box V, in which are placed several guides which guide the air entering therein, as will be hereinafter shown, to the side of said screen, the volume of air being sufficient to keep the contents of the screen in constant agitation and tends to free the cellulose to be preserved from the fine particles of dust and dirt. The screen E is also on an inclined plane, this incline having been determined by practical experience to be about one-half inch to the foot in length.

As the product is passed down longitudinally through the screen E it comes to a secondary screen F of the same diameter, however, as the screen E and extends from the point E' to the point E'' and is of a mesh (about four meshes to the inch in actual practice, as shown in Fig. 15) that allows the cellulose proper to pass through its meshes, it taking a specified number of revolutions to produce the centrifugal force essential to this result. The screen F is a continuation of the screen E, they being of the same diameter and rotating upon the same long shaft $p$. The screen E extends from the upper end of said shaft, as shown, to the point E', and the screen F extends from said point E' to the lower end thereof, or the point E''. There is no break or interruption between the lower end of the screen E and the upper end of the screen F save the change of the mesh from twenty-two meshes to the inch to four meshes to the inch, and the product is carried along longitudinally through said screens and from screen E to said screen F by gravity. Around the lower portion of said long screen or said two screens E F and concentric therewith is the larger screen G. The screen G also extends from the point E' nearly to the end of said screen F, (see Figs. 10 and 16,) the lower end of the screen G being inclosed in the annular box K, as will be hereinafter more minutely described. The object of the coarse-meshed screen F is to eliminate from the product at this point any portions of the coarser materials which may have passed through the primary screen A, ejecting such coarser materials from the lower end E''' thereof by gravity, permitting the finer product, in which is the corn cellulose, to pass through its coarse meshes onto the larger and surrounding screen G, which is also finely meshed, having about twenty-two meshes to the inch in actual practice, as shown in Fig. 14, and which allows to pass through its meshes only such portions of the dust and dirt as may have escaped the screen E, all the said dust and dirt passing through the said screen E and the screen G falling into the box H through the incline chutes H'' and H'. The partially-cleaned cellulose that has passed into the screen G eventually passes by gravity over the lower edge G' of the said screen G and into the annular ring-like box K, surrounding the lower end of the screen F, the outer end of the said screen G being flanged outward and at right angles, as shown at $s$ in the detail Figs. 10 and 16, this flange working in the annular groove of said box K to prevent the passage of the product through the clearance-space between the outside of the screen and the inner edge of the box. At the lower end of the box K is the guide-chute K', which conveys the product of the screen G onto the shaker-screen L. The product passing through the chute K' drops onto the shaker-screen L, which has a rapid reciprocating motion obtained through the lever connections M and the eccentric 3 on the shaft 4 of the blower. The blower N is constructed, as shown in Figs. 11 and 12, of the box N, having openings 6 6 in its sides, in the middle thereof, permitting the entrance of air into the box closely around the axis on which the fans 1 1 revolve. The fans or paddles 1 1 are attached to the shaft 4, which is propelled by any suitable means, as by a pulley 2 and belt. Upon the shaft 4 are the eccentrics 3 3, which work in the slotted pitmen 5, causing through the lever connections M the reciprocating motion of the shaker-screen L. The reciprocations of the screen L are in harmony with the blast of the blower N, said blower forcing a volume of air equal to the agitation of the particles of the cellulose, but not strong enough to prevent any heavier foreign matter from passing through said screen and dropping into the box O. The screen L is also on an incline, and the product passing over would naturally drop into the box P were it not for the volume of air coming from the blower N and passing up through the meshes of the screen L and through the opening R carrying it against the slightly-inclined planes S and S'. Here again any heavier particles not properly belonging to the finished product have a tendency to strike against the inclined plane S, passing over its lower edge and falling onto the inclined plane S' and eventually into the box P. It is found in practical operation that these heavier particles ofttimes carry with them portions of the finished product that it is desirable to save. Therefore in their passage from the inclined plane S to the secondary inclined plane S' they are again subjected to the volume of air passing through the passage R and are forced up the secondary inclined plane S' into the final receptacle T for the finished product.

Extending from the blower N, which may be of any particular make or construction so it be sufficient for the purposes described, is the wind-conduit U, which leads from said blower into the upper end of the box V. This elongated box projects outwardly and inwardly from the line of the outer boxing of the said screen E, its inner edge coming close to the face of the screen. Within the said box are air-guides set at an angle essential to conveying the air that comes through the conduit-pipe U at the point U' (see Figs. 4 and 5) against the sides of the screen. These guides V', V'', V''', and V'''' are of different lengths, with catch-curves at their outer end. The one closest to the entrance of the conduit U is short, the others gradually increasing in length that they may guide the volume of air along and into the side of the screen E with a uniform pressure. The passage of this air thus conveyed along the side of the screen keeps the contents of the said screen in constant agitation and aids in the downward passage of the desired product to its exit in the annular conduit and at the same time frees the meshes of the screen from any particles of dirt having a tendency to adhere thereto.

Having thus described my invention and the processes through which the product passes to its final separation and cleaning, what I claim as new, and desire to secure by Letters Patent, is—

1. The combination, in a machine for separating and cleaning corn cellulose, of an inclined cylindrical rotating screen, its upper portion being of a fine mesh, and its lower portion of a coarse mesh; a cylindrical rotating screen of larger diameter and substantially the same size mesh as said upper portion, and surrounding, parallel to and concentric with, said lower portion, the lower end of said larger screen being flanged outwardly; and an annular or ring-like conveyer-box, which incloses the said flanged lower end of said surrounding screen, substantially as shown.

2. In a machine for separating and cleaning corn cellulose, the combination of a rotating cylindrical screen and a wind-distributing box, said box being placed along and near, but not in contact with, the outside of said screen, and consisting of an elongated box, its inner face open, containing a series of graduated vanes or wind-guides, fixedly attached within said box, at an angle to the direction of the incoming blast, thence toward said screen, substantially as shown.

3. The combination, in a machine for separating and cleaning corn cellulose, of a primary inclined cylindrical rotating screen of a large mesh; a secondary inclined cylindrical rotating screen having its upper portion fine-meshed and its lower portion coarse-meshed; a tertiary inclined cylindrical rotating screen, of a fine mesh, surrounding, parallel to and concentric with, the lower, or coarse-meshed portion of said secondary screen, and having its lower end flanged outwardly; an annular ring-like conveyer-box, which has an annular opening in its inner facing side, in which is rotatably inclosed said flanged end of said tertiary screen; an inclined reciprocating shaker-screen, and an incline plane located facing the lower end of said shaker-screen, and a blower with a throat or guiding-opening, which direct the blast from the blower along substantially horizontally under said shaker-screen and against said incline plane; together with suitable chutes and receptacles, substantially as shown.

In testimony whereof I have affixed my signature in presence of two witnesses.

BENJAMIN G. KRAPF.

Witnesses:
G. W. HARRIS,
JOSEPH GROLL.